(12) United States Patent

Goussev et al.

(10) Patent No.: US 10,346,396 B2
(45) Date of Patent: Jul. 9, 2019

(54) ALTERING SEARCH SEQUENCE TO CAUSE MULTIPLE SEARCHES TO LOAD AND EVALUATE SEGMENTS TOGETHER

(71) Applicant: Quest Software Inc., Aliso Viejo, CA (US)

(72) Inventors: Artem Nikolaevich Goussev, St. Petersburg (RU); Vadim Alexandrovich Senchukov, St. Petersburg (RU)

(73) Assignee: QUEST SOFTWARE INC., Aliso Viejo, CA (US)

( * ) Notice: Subject to any disclaimer, the term of this patent is extended or adjusted under 35 U.S.C. 154(b) by 346 days.

(21) Appl. No.: 15/226,747

(22) Filed: Aug. 2, 2016

(65) Prior Publication Data

US 2018/0039670 A1 Feb. 8, 2018

(51) Int. Cl.
G06F 17/30 (2006.01)
G06F 16/2453 (2019.01)

(52) U.S. Cl.
CPC .................................. *G06F 16/2453* (2019.01)

(58) Field of Classification Search
None
See application file for complete search history.

(56) References Cited

U.S. PATENT DOCUMENTS

| | | | | |
|---|---|---|---|---|
| 9,064,013 | B1* | 6/2015 | Gay | H04L 29/06 |
| 2010/0082603 | A1* | 4/2010 | Krompass | G06F 17/30463 |
| | | | | 707/719 |
| 2010/0332457 | A1* | 12/2010 | Graefe | G06F 17/30321 |
| | | | | 707/673 |
| 2016/0306836 | A1* | 10/2016 | Mortazavi | G06F 17/30336 |

* cited by examiner

*Primary Examiner* — Alex Gofman
(74) *Attorney, Agent, or Firm* — Kirton McConkie; Brian Tucker

(57) ABSTRACT

The sequence of one or more searches can be altered to cause multiple searches to load and evaluate segments together. When a first search query is executed, a query processor can commence loading segments of an indexed store to thereby evaluate the first search query against the segments. Then, if a second search query is received while the first search query is executing, the query processor can cause the second search query to commence on the same segment that the first search query is currently being evaluated against. The first and second search queries can then continue execution together until the first search query has been evaluated against all segments. The query processor can then continue executing the second search query against the remaining segments until it reaches the segment on which its execution commenced.

20 Claims, 15 Drawing Sheets

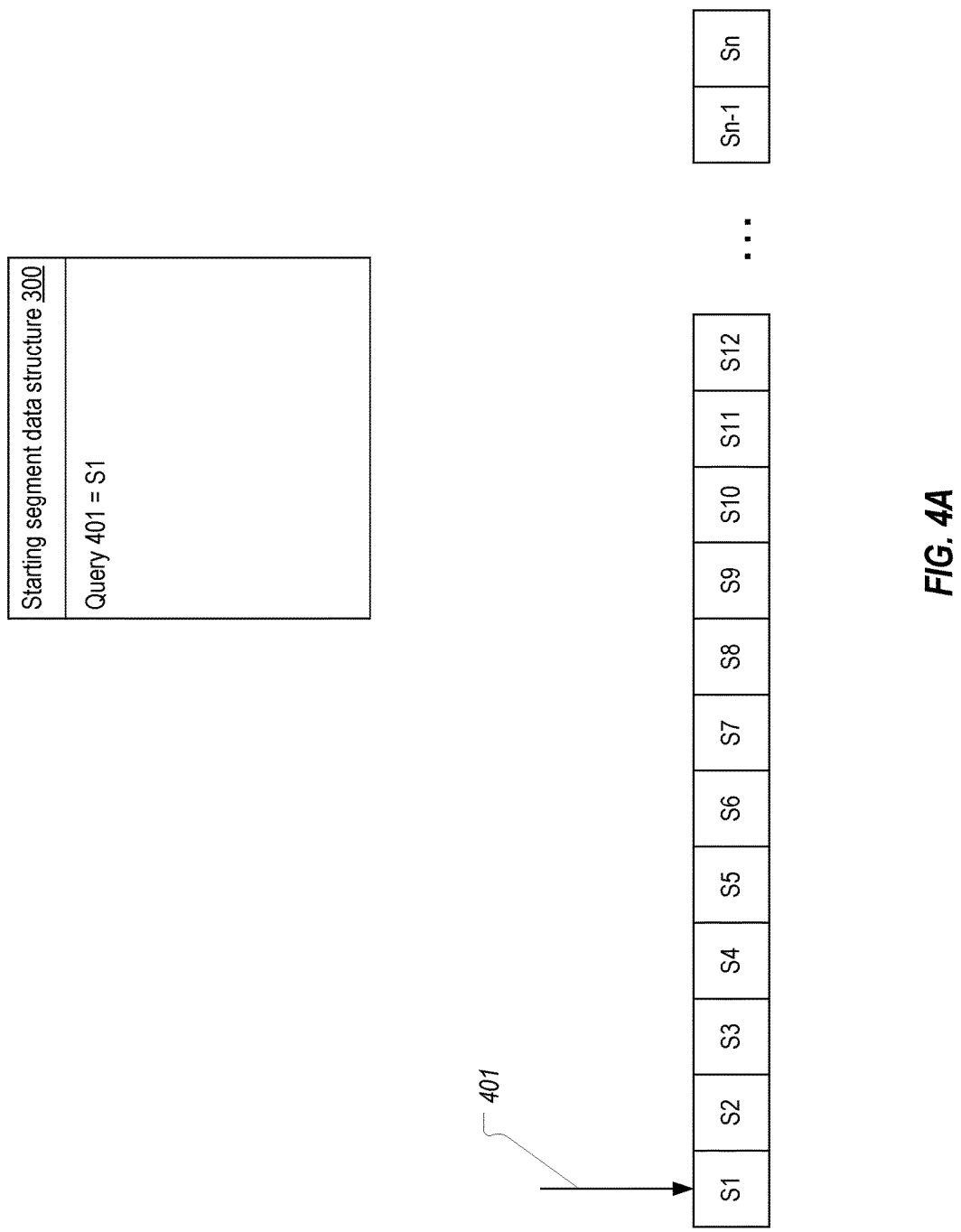

ALTERING SEARCH SEQUENCE TO CAUSE MULTIPLE SEARCHES TO LOAD AND EVALUATE SEGMENTS TOGETHER

CROSS-REFERENCE TO RELATED APPLICATIONS

N/A

BACKGROUND

The present invention is generally directed to optimizing the performance of searches. In particular, the present invention can be implemented to alter the search sequence of one or more searches so that multiple searches can load segments of an indexed store and search within them together.

In some computing environments, a server provides access to an indexed store which can be searched. In such environments, clients may submit requests to the server for searching the indexed store for specified content. In response, the server will perform the necessary operations to load segments of the indexed store and then search within the loaded segments for the specified content. Under ideal conditions, the server will be capable of executing these searches in an acceptable amount of time. However, in many cases, the server may receive too many searches which may overload the server and cause its performance to suffer. For example, each time a search is executed, the server will be required to load each segment of the indexed store resulting in a large number of disk operations and a large amount of memory consumption. Further, if the indexed store happens to be stored in network storage, these loads will occur over the network which may result in the network becoming congested. When this overloading occurs, a search may be executed in an unacceptably slow manner or may even fail.

To address these overload scenarios, many systems may limit the number of requests that can be processed during a period of time. In such cases, if a client submits a request when the server is overloaded, the server may deny the request. Such denials extend the performance shortcomings to the client. Further, the denials can give the perception that the system is faulty or otherwise unsatisfactory.

BRIEF SUMMARY

The present invention extends to methods, systems, and computer program products for altering the sequence of one or more searches to cause multiple searches to load and evaluate segments together. When a first search query is executed, a query processor can commence loading segments of an indexed store to thereby evaluate the first search query against the segments. Then, if a second search query is received while the first search query is executing, the query processor can cause the second search query to commence on the same segment that the first search query is currently being evaluated against. The first and second search queries can then continue execution together until the first search query has been evaluated against all segments. The query processor can then continue executing the second search query against the remaining segments until it reaches the segment on which its execution commenced. In this way, the overhead of loading segments when multiple search queries are being executed is reduced.

In one embodiment, the present invention is implemented in a server system that includes a query processor for executing search queries against an indexed store containing a plurality of segments. The query processor can be configured to alter a search sequence of a search query by: executing a first search query by loading segments of the indexed store and evaluating the first search query against the loaded segments; while the first search query is being executed, receiving a second search query; in response to receiving the second search query, identifying a segment of the indexed store against which the first search query is currently being evaluated; and commencing execution of the second search query on the identified segment such that the first and second search queries are concurrently evaluated against the identified segment while the identified segment remains loaded.

In another embodiment, the present invention can be implemented as computer storage media storing computer executable instructions which, when executed by one or more processors of a computing system that includes a query processor for executing search queries against an indexed store containing a plurality of segments, implement a method for altering a sequence of a search query. This method can include: receiving a second search query while a first search query is executing; determining a current segment of the indexed store against which the first search query is currently being evaluated; and commencing execution of the second search query on the current segment.

In another embodiment, the present invention can be implemented as a server that includes an interface for receiving search queries and a query processor for executing the received search queries against an indexed store that includes a plurality of segments. The query processor is configured to cause a received search query to commence execution on a particular segment of the indexed store when it is determined that one or more other search queries are currently executing on the particular segment.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A-4G illustrate an example of how the search sequence of multiple search queries can be altered.

DETAILED DESCRIPTION

In this specification, the term "index" should be construed as a data structure that stores any type of data in a manner that allows the data to be searched as text. The term "segment" should be construed generally as a portion of an index, i.e., a sub-index. As an example, an index can be created and accessed via the Apache Lucene search engine library. In such cases, an index consists of a sequence of documents where each document consists of a number of terms (i.e., field:value pairs), and the index may be structured as an inverted index, i.e., the index may identify which documents each term appears in. In such cases, the loading of a segment can consist of reading one or more files (e.g., a .cfs file) of the segment into memory.

The term "indexed store" should be construed as a plurality of indexes that are employed to store related data. As an example, in some embodiments, a plurality of Lucene indexes (i.e., an indexed store) may be used to store a particular type or types of data. Also, in such embodiments, each of these indexes could be structured to include a single segment such that the process of searching an index is substantially synonymous with loading a single segment. In other words, as will become more apparent below, a system configured in accordance with embodiments of the present invention may create an indexed store by defining a number of different Lucene indexes and attempting to configure each index so that it includes only a single segment (e.g., by passing in .cfs files that define a single-segment-per-index structure). However, even in such cases, the Lucene engine may create more than one segment in some of these indexes and therefore the invention should not be limited to cases where all indexes include only a single segment.

Figure 1:
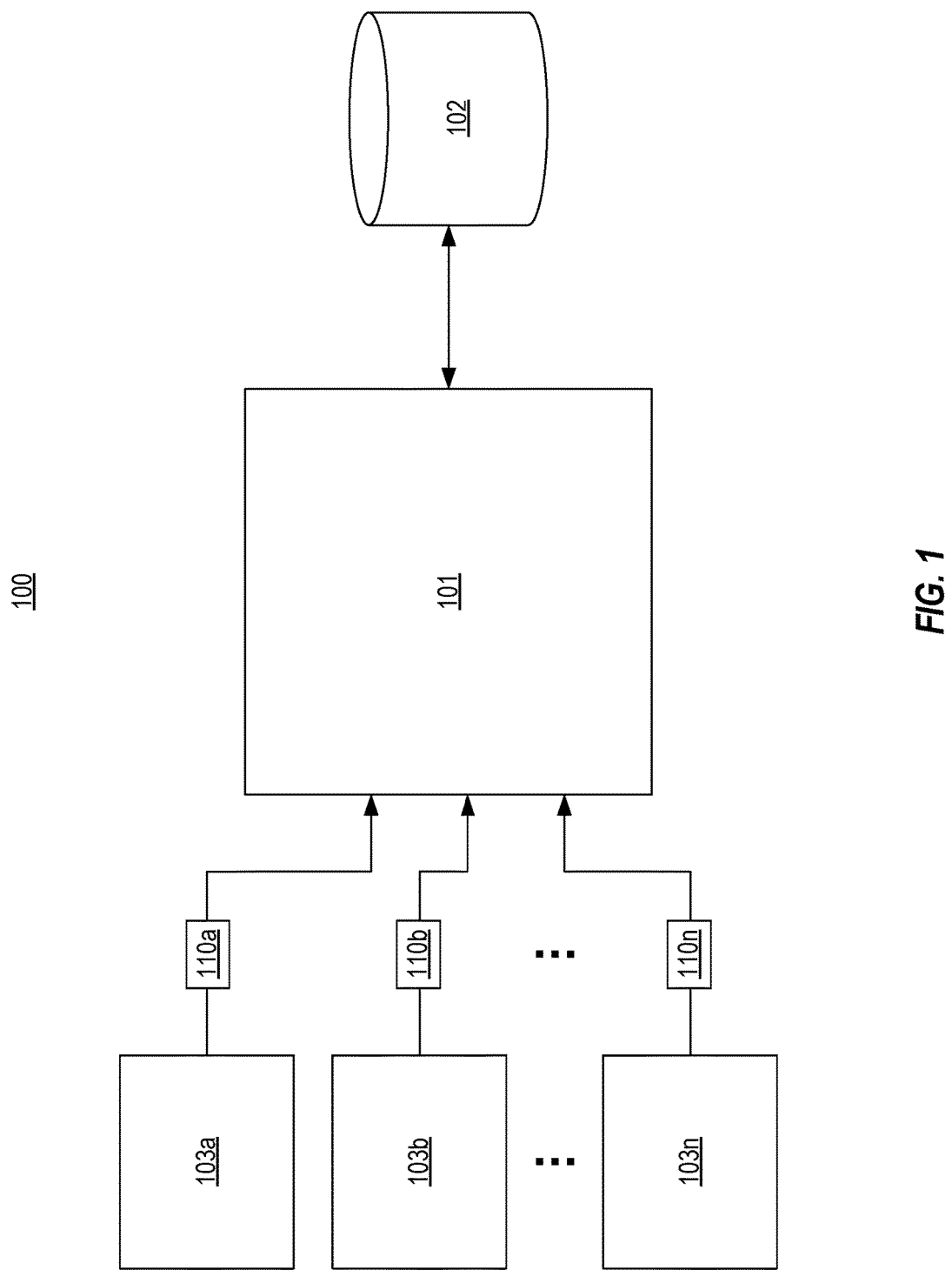
FIG. 1 illustrates an example computing environment in which the present invention can be implemented.

FIG. 1 illustrates an example computing environment 100 in which the present invention can be implemented. Computing environment 100 includes a server 101 that includes or that can otherwise access storage 102. In FIG. 1, storage 102 is depicted as being separate from server 101 to represent embodiments where storage 102 functions as network storage. In other words, server 101 and storage 102 are coupled to a network over which server 101 accesses storage 102. However, the present invention extends to embodiments where storage 102 may be one or more local storage devices (e.g., a local hard drive). Storage 102 is intended to generally represent many different types and/or numbers of storage devices. Accordingly, the particular configuration of storage 102 is not essential to the present invention.

Server 101 can provide an API by which clients 103a-103n can submit requests to access content stored on storage 102. For example, server 101 may implement a REST API by which clients 103a-103n can submit HTTP requests defining queries for accessing an indexed store maintained on storage 102. As represented in FIG. 1, a potentially large number of clients 103a-103n may submit requests 110a-110n at any particular time. As indicated in the background, if too many requests are submitted within a short period of time, server 101 may experience substantial load that could potentially affect its performance. In particular, if many of these requests are search requests that require that server 101 load and examine each segment of an indexed store, server 101 could potentially be unable to service each request in a timely manner.

To address such issues and in accordance with embodiments of the present invention, server 101 can implement a technique for altering a sequence of a search query so that multiple search queries are executed together or "as a bundle," i.e., by loading a segment and evaluating each search query against the loaded segment before unloading the segment. In this way, server 101 can fulfill the multiple search requests by loading the segments of the indexed store a single time rather than redundantly loading the segments for each search request.

Figure 2:
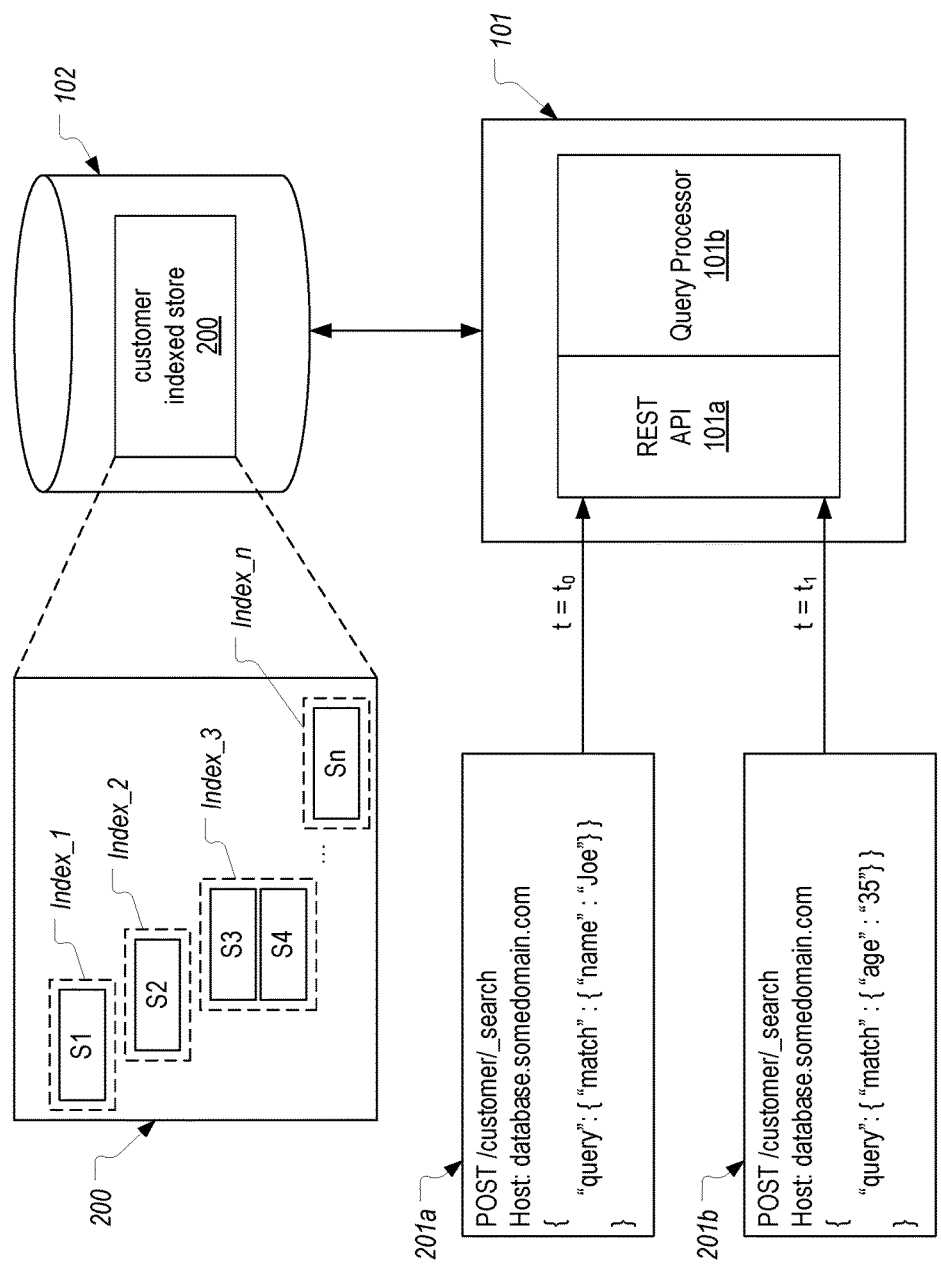
FIG. 2 illustrates how a server can receive client requests to search an indexed store on network storage.

FIG. 2 provides a more detailed example of a computing environment in which the present invention may be implemented. In this example, it is assumed that storage 102 stores a customer indexed store 200 and that server 101 provides a REST API 101a through which clients can submit requests for accessing customer indexed store 200. As shown, customer indexed store 200 can be comprised of a number of indexes (Index_1 through Index_n) each of which preferably includes a single segment. However, even when attempting to confine an index to a single segment, the indexing engine (e.g., the Lucene engine) may sometimes create more than one segment. For this reason, index_3 is shown as including two segments, S3 and S4. In this example, it can be assumed that each of segments S1 through Sn stores customer data.

Server 101 is also shown as including a query processor 101b which is configured to execute queries received via REST API 101a including to issue appropriate commands for loading segments of customer indexed store 200 into memory of server 101 and to evaluate such segments in accordance with the parameters of an executed query. In an example embodiment, query processor 101b may be configured to employ the Lucene code library and API for processing such queries. It is noted, however, that Lucene is only one example of a suitable engine that could be used in embodiments of the present invention.

For purposes of this example, it will be assumed that a first query 201a is received at time $t_0$ while a second query 201b is received at a later time $t_1$. Both of queries 201a and 201b comprise search requests of customer indexed store 200 (as indicated by the _search parameter in each request). In particular, first query 201a defines a request to search customer indexed store 200 for documents having a name field with a value of Joe, whereas second query 201b defines a request to search customer indexed store 200 for documents having an age field with a value of 35. It is noted that queries 201a and 201b are generally formatted in accordance with the Elasticsearch API which is one example of a REST API that can be employed to provide access to customer indexed store 200. However, the present invention should not be limited to Elasticsearch or any other provider, but should extend to any implementation that allows clients to search an index or indexed store including those that provide an API other than a REST API for such access.

Although this example refers to queries 201a and 201b being received at different times, the exact timing when each request is received is not critical (e.g., because the queries may not necessarily be executed in the order in which they are received). What is important is when the queries are processed (or executed) as will become apparent below. However, for ease of illustration, the receipt of a request and the commencement of processing of the request will be viewed as occurring simultaneously and referred to interchangeably.

Because queries 201a and 201b are both directed to customer indexed store 200 and both involve searching for documents matching particular parameters, it will be necessary to load each segment of customer indexed store 200 and evaluate each document in customer indexed store 200 against the parameters. In a Lucene-based example, this loading of the segments of customer indexed store 200 can be accomplished by calling the open method of the IndexReader class to open a directory containing one of the indexes of customer indexed store 200. As an example and assuming each directory has the same name as the index it contains, query processor 101b may call "IndexReader indexReader=IndexReader.open(Index_1)" to load each segment of Index_1 (which in this case is only segment S1) and may then create a searcher for searching the loaded index, e.g., by calling "IndexSearcher indexSearcher=new IndexSearcher(indexReader)." A query can then be executed against the segment(s) as is known in the art.

As introduced in the background, this process of loading a segment (i.e., the process of opening a directory containing an index comprised of one or more segments) requires a relatively large amount of overhead and can overwhelm a system when a large number of queries are processed within a short period of time. For example, if four search queries are being executed at the same time, each query may cause a different segment to be loaded into memory thereby quickly exhausting memory or possibly preempting another active segment.

To address this issue, the present invention can alter the sequence of a search query to cause segments to be loaded and evaluated simultaneously by two or more search queries. In particular, if a first search query is currently executing when a second search query is received, the execution of the second query can be commenced on the segment that the first search query is currently evaluating so that the two queries will proceed together on the same segment thereby eliminating the redundant loading of some of the segments of an indexed store.

FIGS. 3A-3D illustrate an example of how query processor 101b can alter the sequence of segments that a search query evaluates in cases where another search query is already executing. This example will be based on the context depicted in FIG. 2. To simplify the example, customer indexed store 200 will be assumed to only have six segments, S1-S6, each of which can be assumed to belong to a different index. In other words, customer indexed store 200 can be assumed to include six indexes, Index_1 through Index_6. However, as mentioned above, in some embodiments, an index may include more than one segment. Therefore, for purposes of this example, any of segments S1-S6 could possibly represent more than one segment.

To facilitate illustration of the techniques of the present invention, segments S1-S6 are depicted in a circular format, and it will be assumed that the segments are typically loaded in numerical order (i.e., S1 first, S2 second, . . . ). In other words, when receiving a search query, query processor 101b can be configured by default (e.g., when no other search query is currently being executed) to first search Index_1, then Index_2, then Index_3, and so on until all indexes (and therefore segments) of customer indexed store 200 have been searched.

Figure 3A:
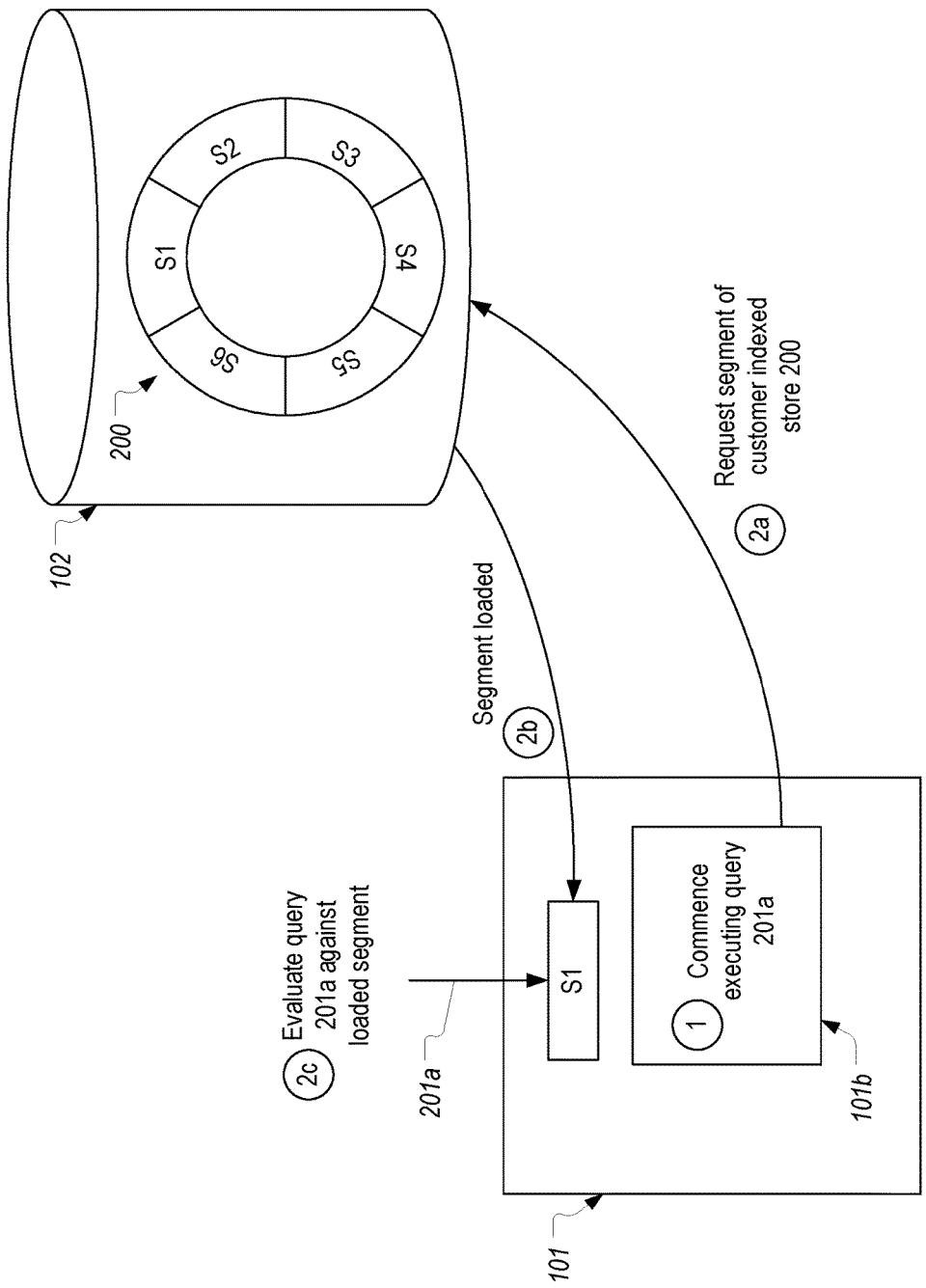
FIGS. 3A-3E illustrate an example of how a query processor can alter the search sequence of a second search query when a first search query is already executing.

As shown in FIG. 3A, in step 1, query processor 101b commences executing query 201a. At this moment, it will be assumed that no other search queries are being evaluated and that query 201b has not yet been received. Accordingly, query processor 101b can commence evaluating query 201a by loading the segments of customer indexed store 200 in accordance with the default sequence. As indicated above, in this example, it will be assumed that this default sequence commences with segment S1 and proceeds in numerical order until segment S6 has been evaluated. Therefore, in step 2a, query processor 101b requests segment S1 from storage 102 thereby causing segment S1 to be loaded into memory in step 2b. As indicated above, this loading of a segment can entail loading one or more files (e.g., a .cfs file) in which the contents of the segment are stored. In cases where an index contains more than one segment, the files for each of these segments in the index can be loaded (e.g., by loading multiple .cfs files). With segment S1 loaded into memory, query processor 101b can evaluate query 201a against segment S1 in step 2C. This execution of query 201a can proceed in similar fashion by loading and evaluating segment S2, then segment S3, etc.

Figure 3B:
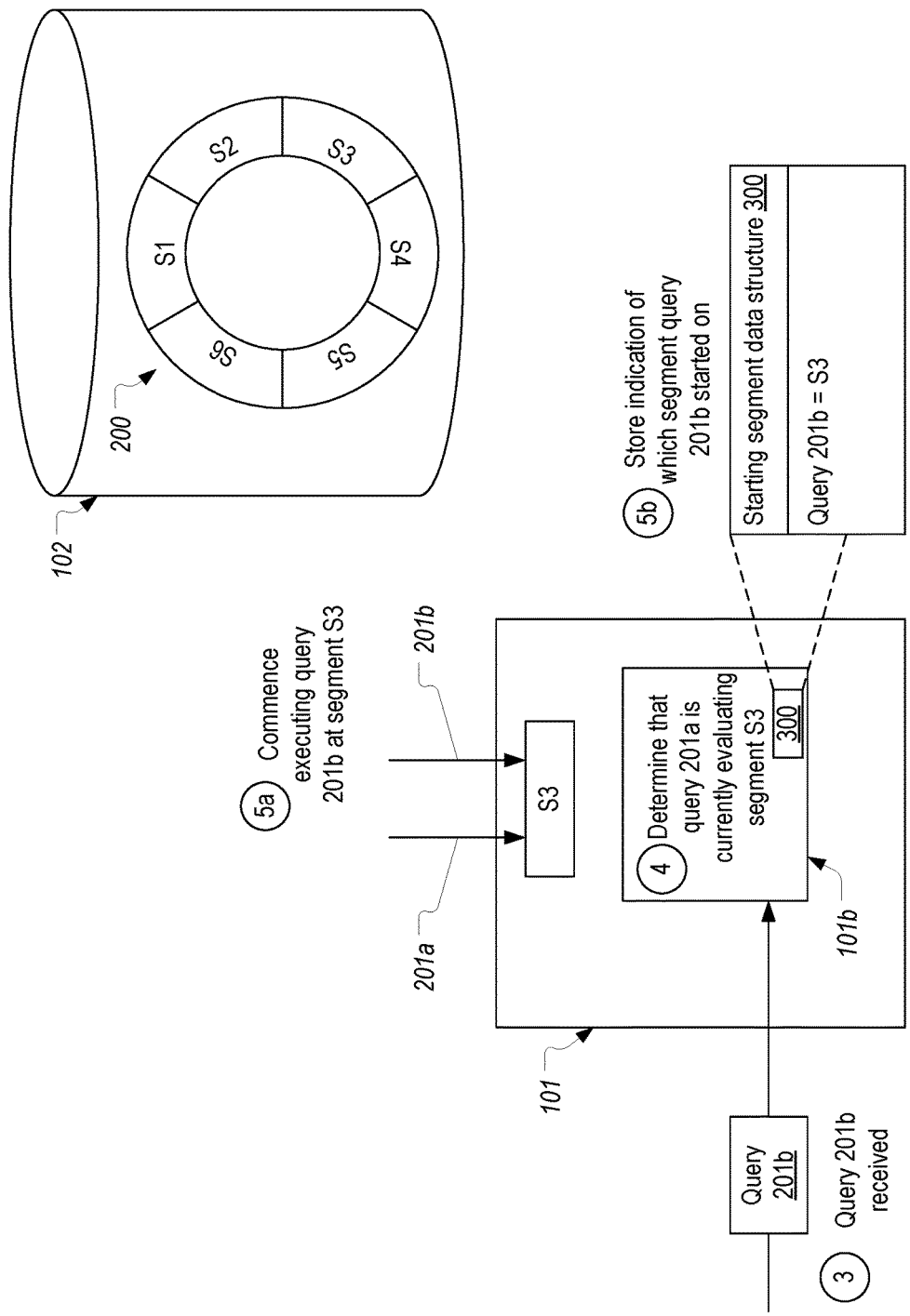
Figure 3C:
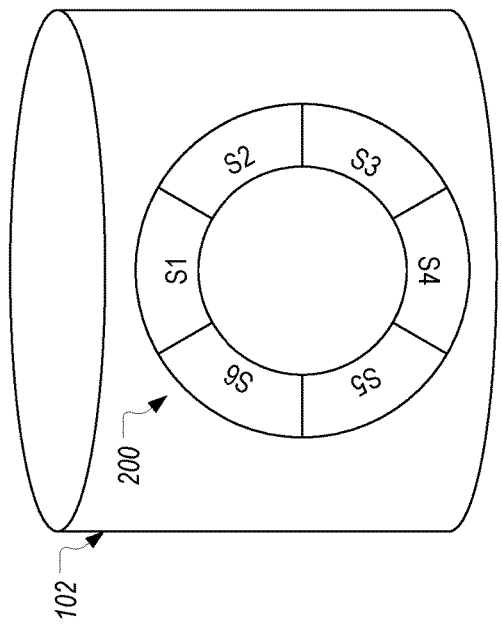
Figure 3C:
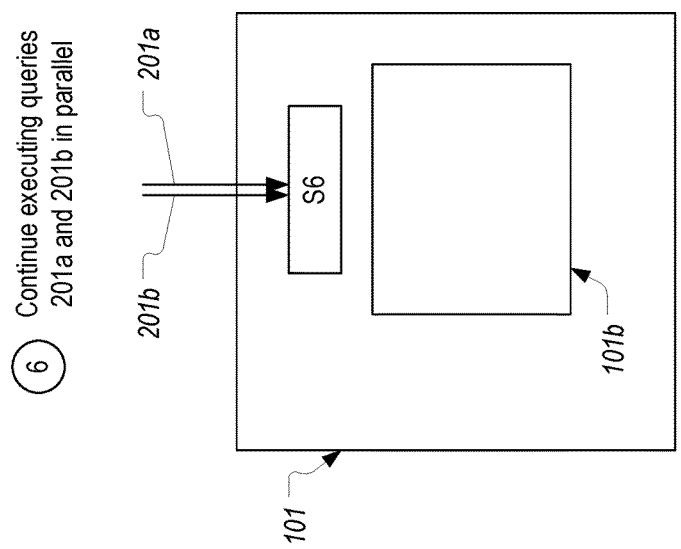
Figure 3D:
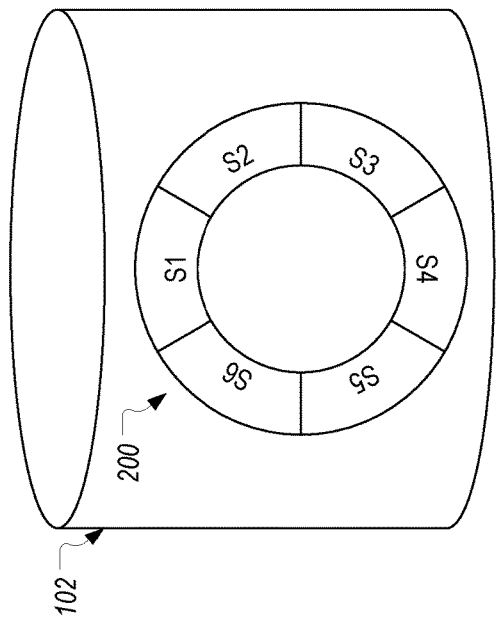
Figure 3D:
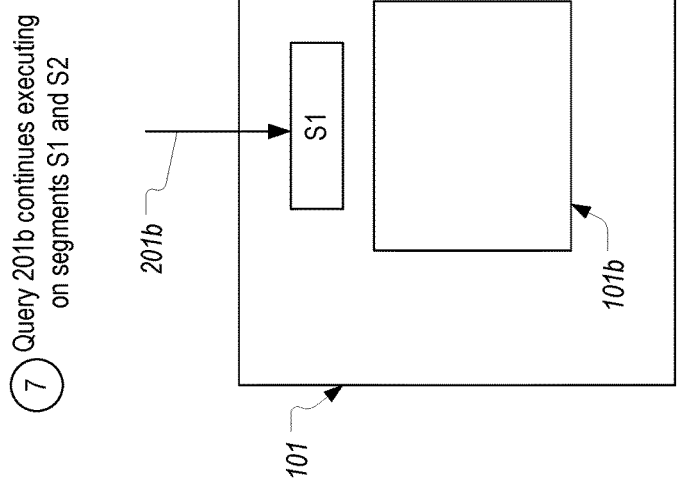
Figure 3E:
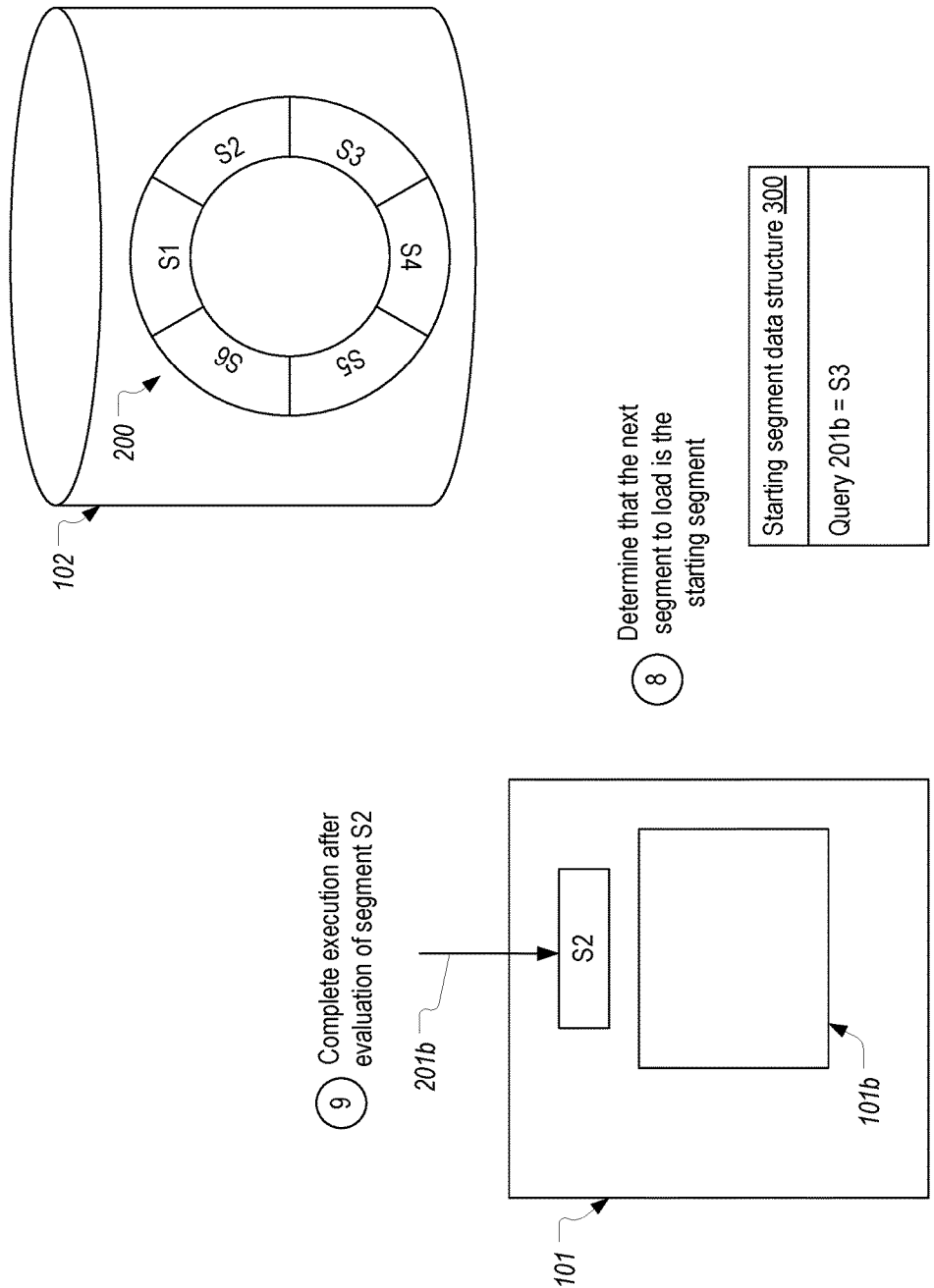

Turning to FIG. 3B, in step 3, query processor 101b receives query 201b. At this moment, it will be assumed that the evaluation of query 201a against segments S1 and S2 has been completed and that query 201a is currently being evaluated against segment S3 which has been loaded into memory. Therefore, in step 4, query processor 101b can determine whether there is another currently executing query, and if so, which segment the query is being evaluated against. In this case, query processor 101b will determine that segment S3 has been loaded for evaluation by query 201a. In response, in step 5a, query processor 101b can cause query 201b to commence executing on segment S3 (as opposed to segment S1 or some other segment of the index) so that queries 201a and 201b can each evaluate segment S3 before segment S3 is unloaded. Additionally, in step 5b, query processor 101b can store an indication defining the segment on which query 201b commenced execution. As an example, query processor 101b can maintain a starting segment data structure 300 which lists on which segments each query commenced. Although not shown, data structure 300 could include an entry defining that query 201a commenced on segment S1. In other words, in some embodiments, query processor 101b can store an indication of which segment each query was started on regardless of whether the "normal" segment sequence was followed.

With the execution of query 201b commenced on segment S3, queries 201a and 201b can then continue executing together, i.e., by loading and evaluating the same segments. For example, as represented by step 6 in FIG. 3C, after queries 201a and 201b have been evaluated against segment S3, segment S4 can be loaded and evaluated by both of the "bundled" queries 201a and 201b after which segment S4 can be unloaded. Next segment S5 can be loaded and evaluated by the bundled queries followed by segment S6. In this way, these segments will only need to be loaded once to process queries 201a and 201b (as opposed to twice if query 201b had been started on segment S1).

Because query 201a commenced execution on segment S1, it will have completed execution upon evaluating segment S6 and can therefore return. In contrast, because query 201b commenced execution on segment S3, it will need to continue execution on segment S1 as represented by step 7 in FIG. 3D. In particular, query processor 101b can load segment S1 after segment S6 has been evaluated and evaluate query 201b against the segment and then load segment S2 for evaluation. Finally, after evaluating query 201b against segment S2, query processor 101b can determine, in step 8, that the next segment to load would be the segment on which query 201b commenced execution. For example, query processor 101b can determine that the next segment to load would be segment S3 and that data structure 300 indicates that query 201b started on segment S3. Therefore, query processor 101b can determine that query 201b has been evaluated against all segments of customer indexed store 200 and can complete execution in step 9. Therefore, data structure 300 can be employed to determine when a query, which could have been started on any segment, has been evaluated against all segments in the index.

In this simplified example, it can be assumed that query processor 101b would have loaded eight segments into memory (i.e., segments S1 and S2 would be loaded initially for query 201a, segments S3-S6 would be loaded for both queries 201a and 201b, and then segments S1 and S2 would again be loaded for query 201b). This is in contrast to loading twelve segments which would have been the case if query 201b had been started on segment S1 (i.e., segments S1-S6 would be loaded for query 201a and then loaded again for query 201b (assuming that the segments would no longer reside in memory when query 201b executes)).

As can be seen, by altering the sequence of segments that are evaluated by a subsequent query such that it commences execution on a segment currently being evaluated by a prior query (i.e., a segment that is already loaded in memory) and continues execution together with the prior query, the performance and efficiency of query processor 101b can be increased. These improvements can be better visualized when considering an example where many queries may be executed at the same time. Such an example is depicted in FIGS. 4A-4G.

Figure 4B:
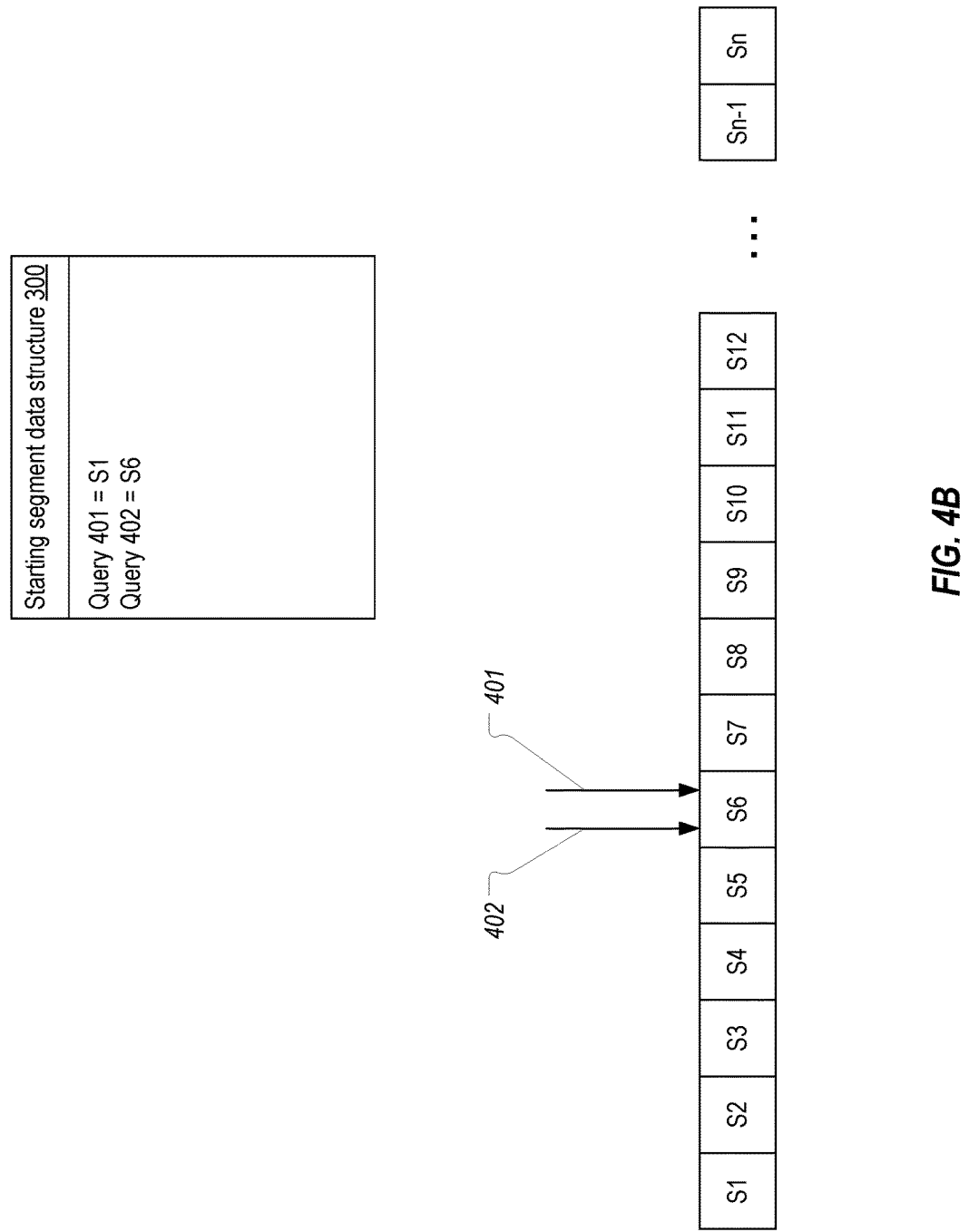

FIGS. 4A-4G represent how the sequence of segments evaluated by a query can be altered based on which segment one or more prior queries are currently evaluating. In this example, an index consisting of segments S1-Sn will be employed, and it will again be assumed that segments are loaded into memory for evaluation in numerical order. In FIG. 4A, a query 401 is commenced on segment S1. As shown, starting segment data structure 300 is updated to show that query 401 commenced on segment S1. Then, in FIG. 4B, it is assumed that query 401 has advanced to segment S6 and that a query 402 is received. Because query 401 is currently on segment S6, query processor 101b can cause query 402 to start on segment S6 and can store a corresponding indication in data structure 300.

Figure 4C:
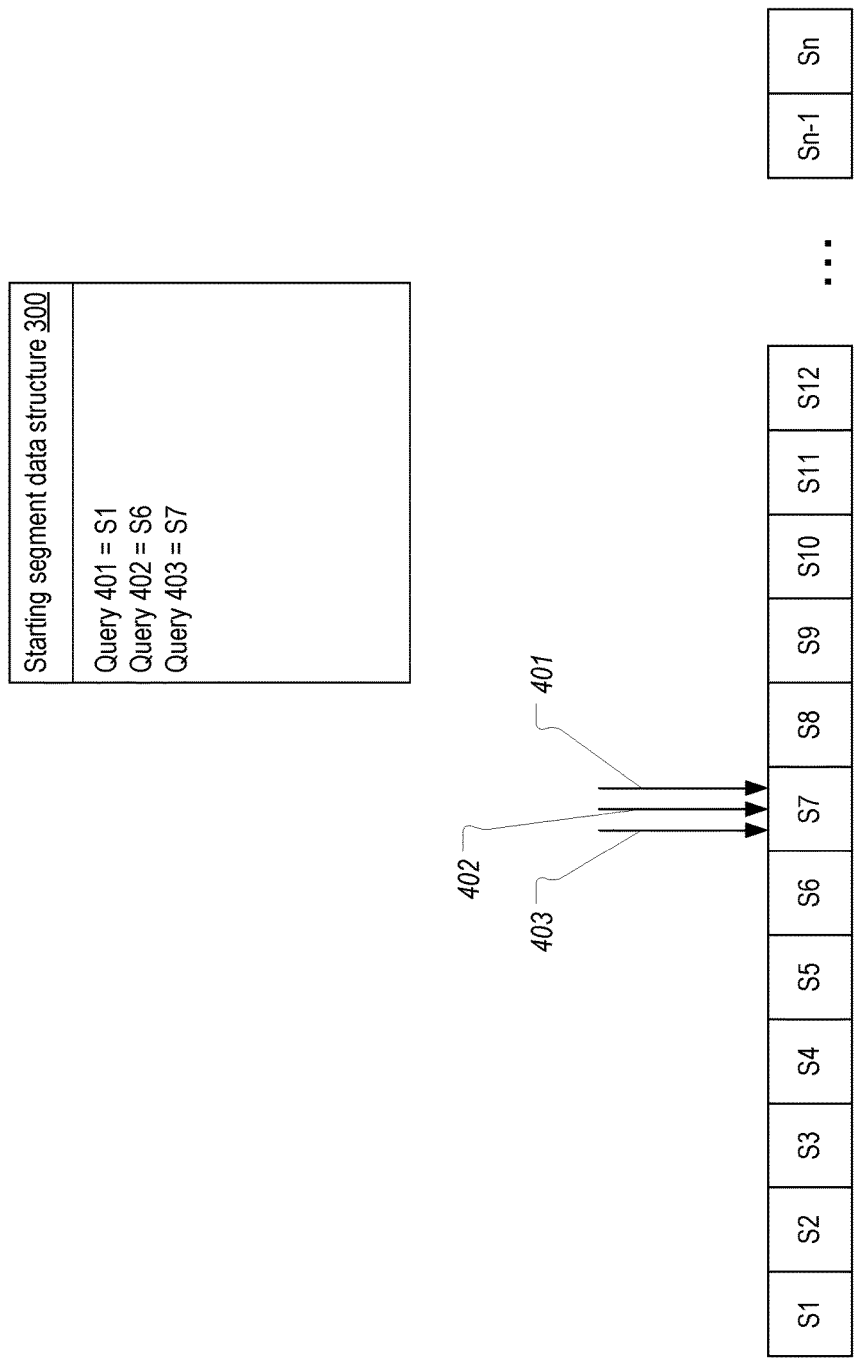
Figure 4D:
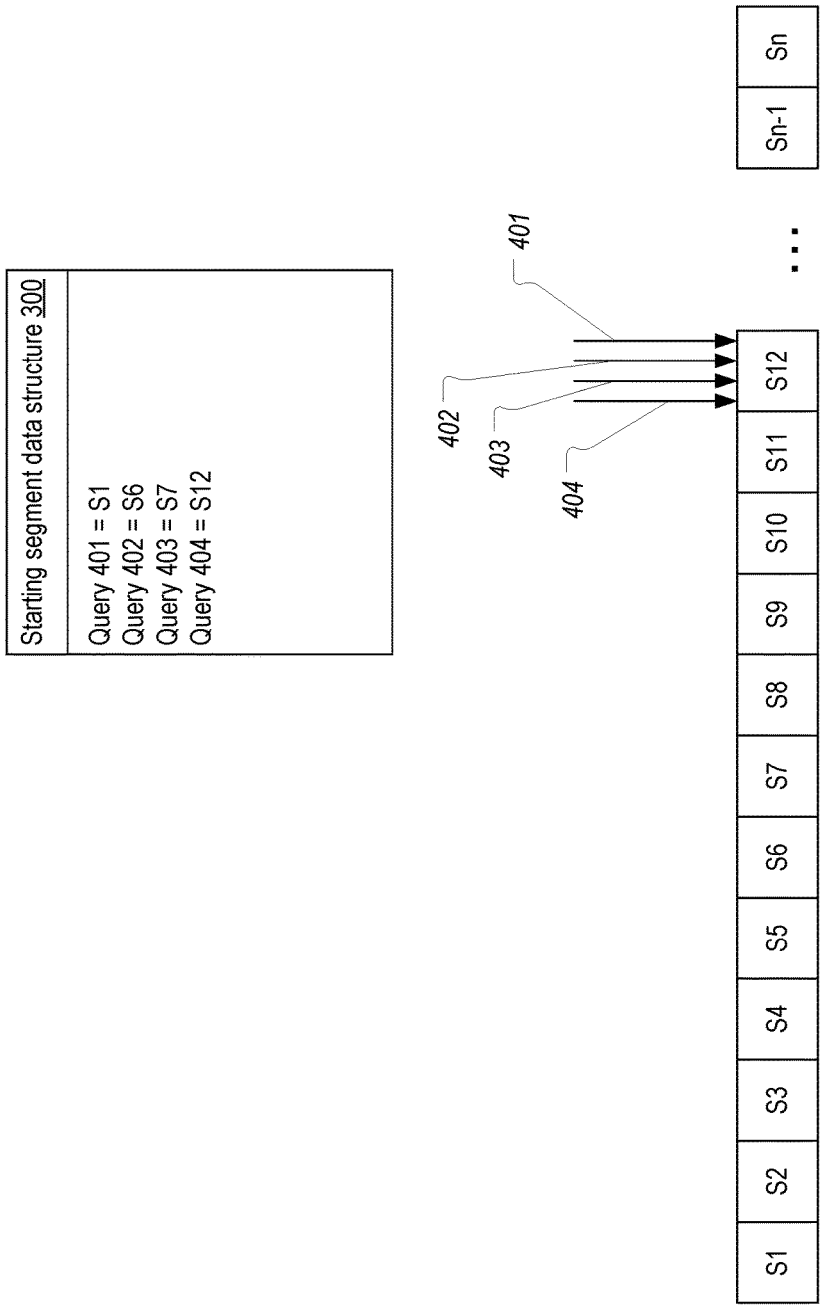

In FIG. 4C, it is assumed that queries 401 and 402 proceeded together to segment S7 at which point a query 403 is received. Query 403 can therefore be commenced on segment S7. In FIG. 4D, queries 401-403 have advanced together to segment S12. While on segment S12, query 404 is received and commenced on the same segment. These four queries can then continue together up through segment Sn.

Figure 4E:
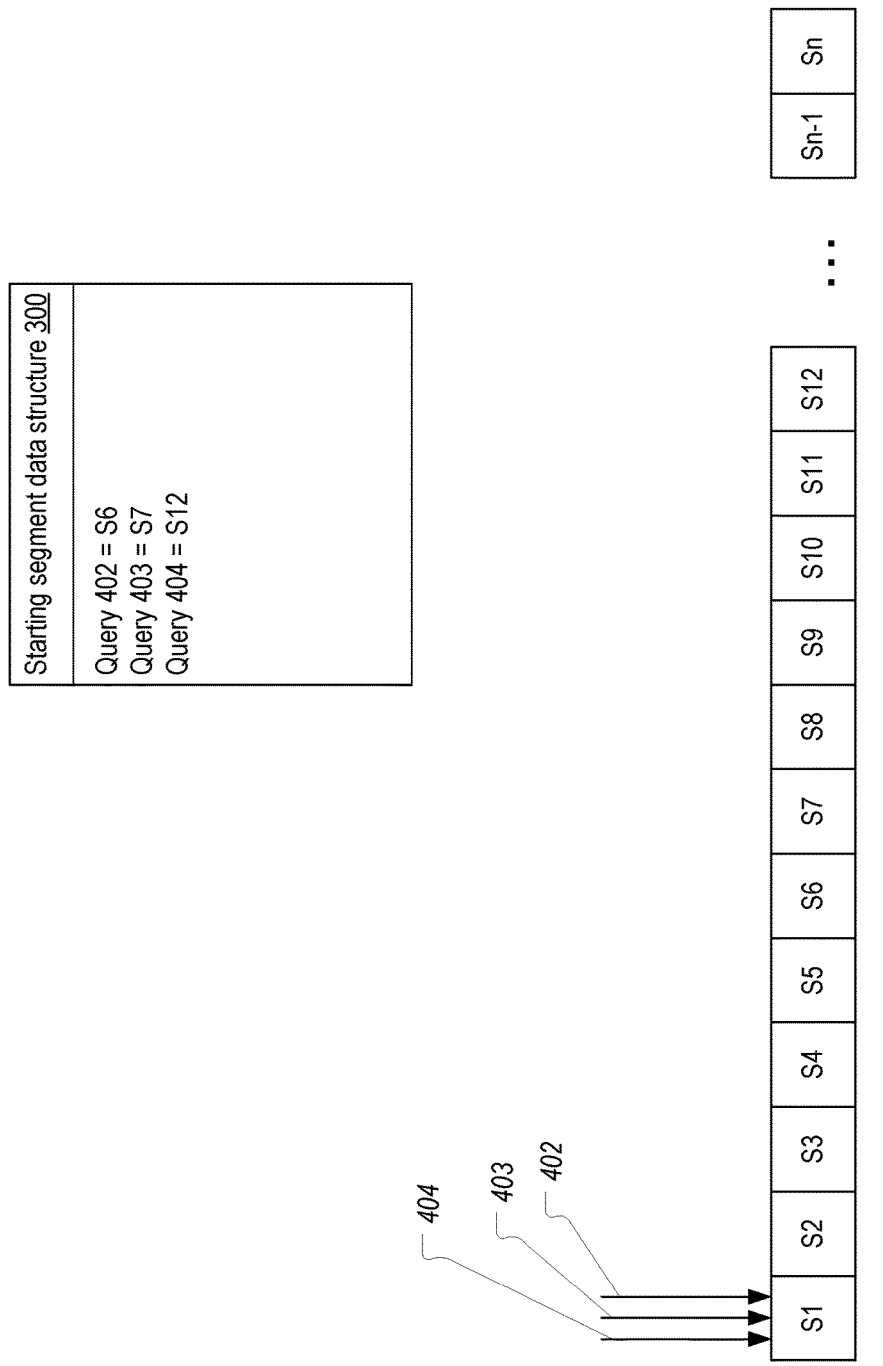
Figure 4F:
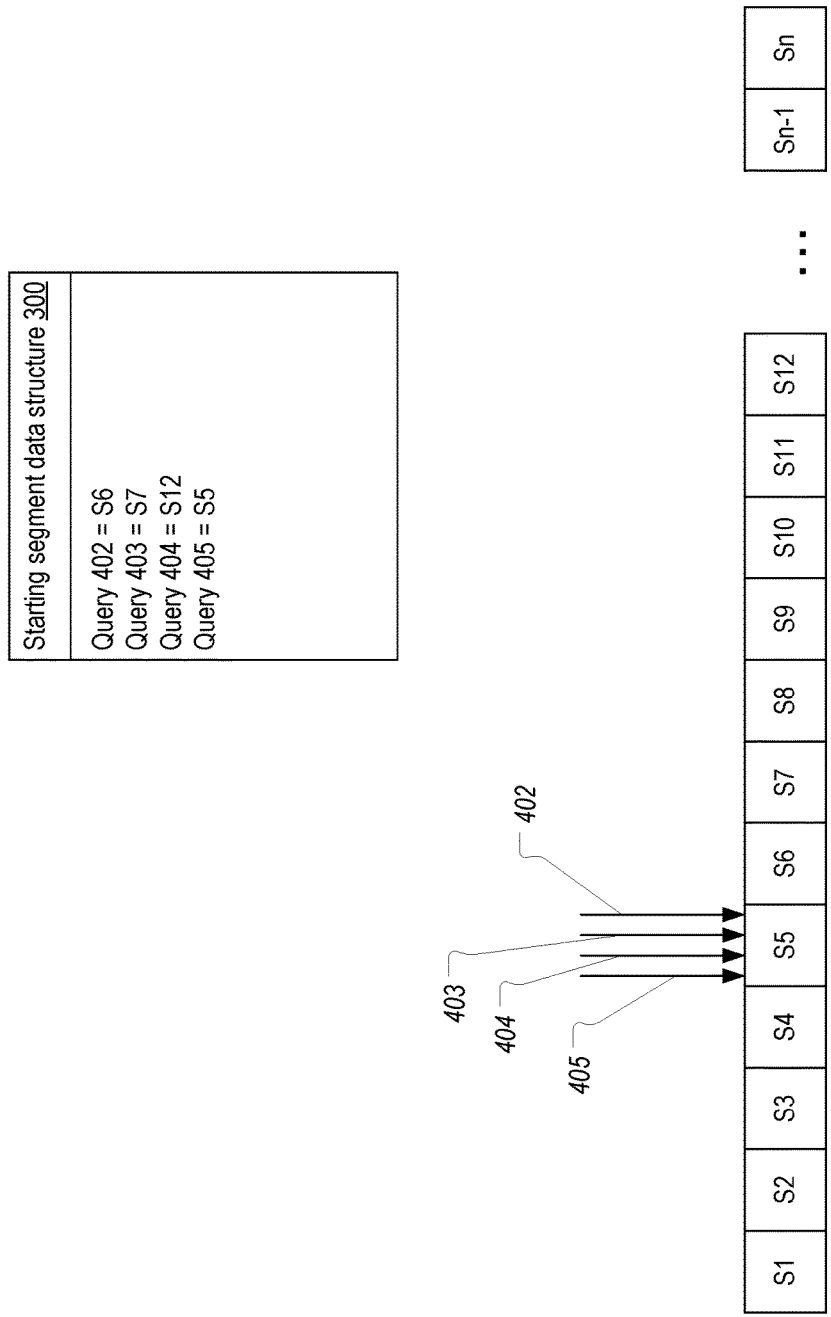
Figure 4G:
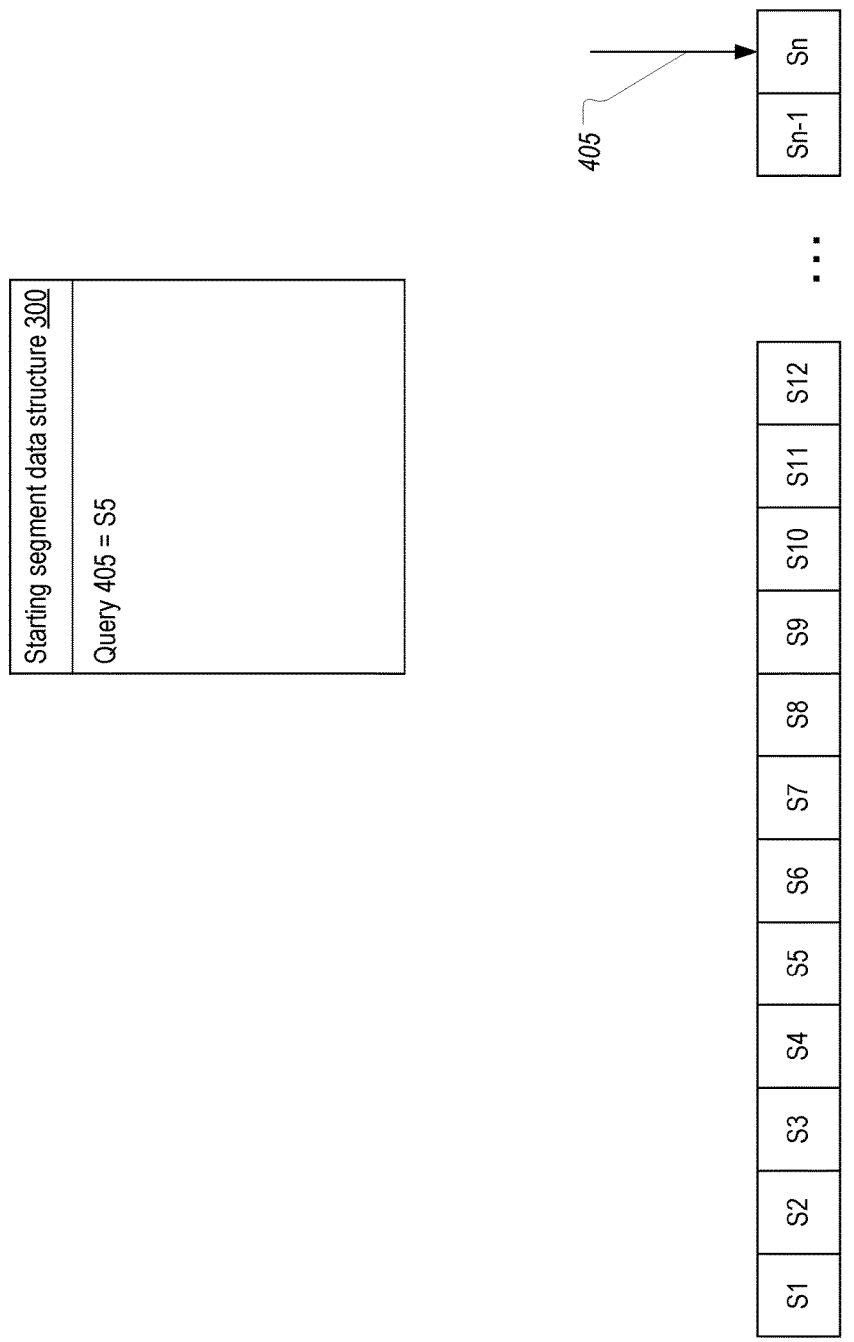

After the evaluation of segment Sn has been completed, query processor 101b can determine, based on data structure 300, that query 401 has been evaluated against all segments of the indexed store (e.g., that the next segment to load is segment S1 and that query 401 started on this segment). Accordingly, the execution of query 401 can be completed with the results being returned to the requester. In contrast, as shown in FIG. 4E, queries 402-404 can continue execution on segment S1. Then, as shown in FIG. 4F, query 405 is received while queries 402-404 are being evaluated against segment S5. Query processor 101b can therefore cause query 405 to commence on segment S5. The bundled execution of these queries can continue until each query has been evaluated against each segment in the indexed store. For example, query 402 can return after being executed against segment S5, query 403 can return after being executed against segment S6, and query 404 can return after being executed against segment S12 thereby leaving query 405 to continue executing alone to segment Sn (as shown in FIG. 4G) and then through segments S1-S4 (assuming no other queries are received in the interim).

Based on this example, it can be seen how the present invention can greatly reduce the number of loads that would occur when processing search queries. This is especially true when a large number of queries may be received within a short window. For example, if the execution of each of queries 401-405 caused each segment to be individually loaded, there would be 5n loads. In contrast, in cases where these five queries are received in close proximity, the number of loads would be much closer to n. This technique also adds very little overhead to the search process. In particular, query processor 101b only needs to maintain a simple data structure for storing an indication of where each query was started. The techniques of the present invention may be particularly suitable in instances where the indexed store is not sorted.

Figure 5:
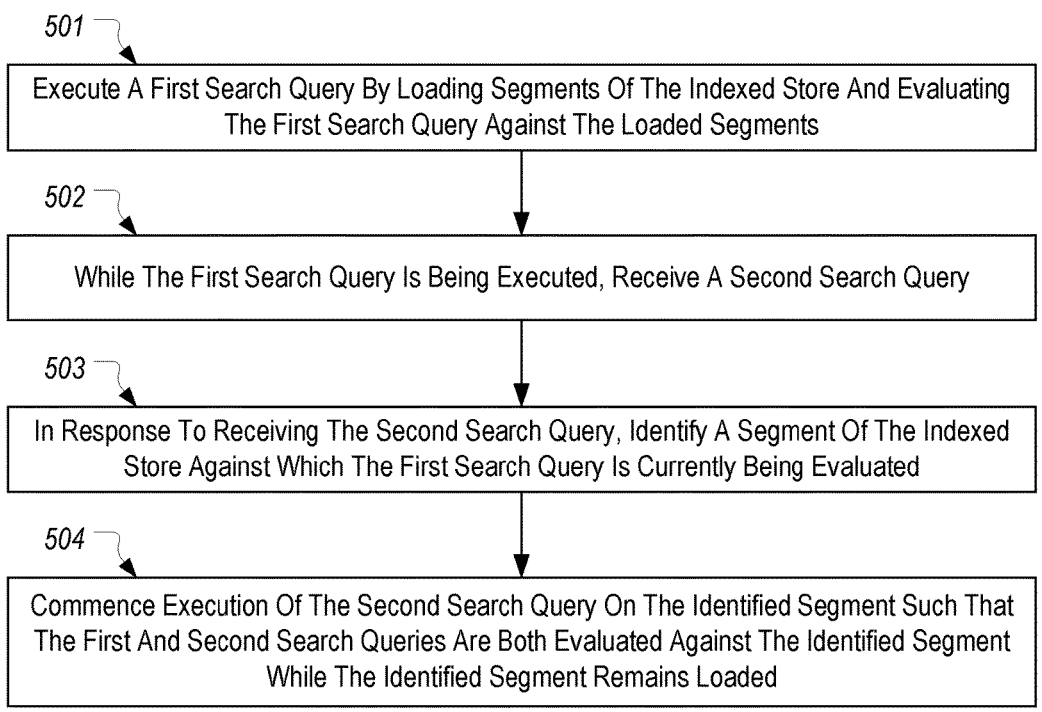
FIG. 5 illustrates a flowchart of an example method for altering a search sequence of a search query.

FIG. 5 provides a flowchart of an example method 500 for altering a search sequence of a search query. Method 500 will be described with reference to the example provided in FIGS. 3A-3E.

Method 500 includes an act 501 of executing a first search query by loading segments of the indexed store and evaluating the first search query against the loaded segments. For example, server 101 can receive query 201a and evaluate it against segments S1 and S2.

Method 500 includes an act 502 of receiving a second search query while the first search query is being executed. For example, query processor 101b can receive query 201b while query 201a is executing.

Method 500 includes an act 503 of, in response to receiving the second search query, identifying a segment of the indexed store against which the first search query is currently being evaluated. For example, server 101 can determine that query 201a is being evaluated against (or is about to be evaluated against) segment S3.

Method 500 includes an act 504 of commencing execution of the second search query on the identified segment such that the first and second search queries are both evaluated against the identified segment while the identified segment remains loaded. For example, query processor 101b can cause query 201b to commence execution on segment S3 (as opposed to segment S1 or another segment) to thereby allow queries 201a and 201b to continue together.

In summary, the present invention can reduce the load on a computing system by causing multiple search queries that are received (or commenced) at different times to be executed together on the same loaded segment. Because the present invention causes search queries to be executed together, the I/O overhead associated with loading indexes (or more particularly, the segment or segments of the indexes) into memory is reduced. At the same time, however, the present invention ensures that each search query will be evaluated against all segments in the index store thereby enabling this optimization in cases where the indexed store may not be sorted.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. In a server system that includes a query processor for executing search queries against an indexed store containing a plurality of segments, a method, performed by the query processor, for altering a search sequence of a search query, the method comprising:
   executing a first search query by loading segments of the indexed store and evaluating the first search query against the loaded segments;
   while the first search query is being evaluated against a particular segment of the plurality of segments of the indexed store and after the first search query has been evaluated against a first set of one or more segments of the indexed store but before the first search query has been evaluated against a second set of one or more segments of the indexed store, receiving a second search query;
   in response to receiving the second search query, determining that the first search query is being evaluated against the particular segment;
   in response to determining that the first search query is being evaluated against the particular segment, commencing execution of the second search query on the particular segment such that the first and second search queries are both evaluated against the particular segment while the particular segment remains loaded;
   continuing the execution of the first and second search queries by loading the second set of one or more segments and evaluating that first and second search queries against each of the one or more segments of the second set; and
   after the first and second search queries have been evaluated against each of the one or more segments in the second set, continuing execution of the second search query by loading and evaluating the second search query against the one or more segments in the first set.

2. The method of claim 1, further comprising:
   storing an indication that the second search query was commenced on the particular segment.

3. The method of claim 1, wherein the query processor is configured to load the segments of the indexed store in a defined order.

4. The method of claim 2, wherein the first set of one or more segments precede the particular segment in the defined order and the second set of one or more segments follow the particular segment in the defined order.

5. The method of claim 1, further comprising:
   determining that the second search query has been evaluated against all segments in the indexed store by determining that a next segment to be loaded is the particular segment.

6. The method of claim 1, further comprising:
   while the second search query is being evaluated against a second particular segment in the first set of one or more segments, receiving a third search query; and
   commencing execution of the third search query on the second particular segment.

7. The method of claim 1, further comprising:
   while the first and second search queries are being evaluated against the one or more segments in the second set, receiving one or more additional search queries; and
   commencing each of the one or more additional search queries on the segment against which the first and search queries are being evaluated when the additional search query is received.

8. The method of claim 1, wherein the indexed store comprises a plurality of indexes.

9. The method of claim 8, wherein each of the plurality of indexes includes a single segment.

10. The method of claim 8, wherein a majority of the plurality of indexes includes a single segment.

11. The method of claim 1, wherein the indexed store is created by defining a plurality of indexes where each of the indexes includes one of the plurality of segments.

12. The method of claim 11, wherein the indexed store also includes at least one index that includes more than one segment.

13. One or more computer storage media storing computer executable instructions which, when executed by one or more processors of a computing system that includes a query processor for executing search queries against an indexed store containing a plurality of segments, implement a method for altering a sequence of a search query, the method comprising:
   executing a first search query by loading segments of the indexed store and evaluating the first search query against the loaded segments;
   while the first search query is being evaluated against a particular segment of the plurality of segments of the indexed store and after the first search query has been evaluated against a first set of one or more segments of the indexed store but before the first search query has been evaluated against a second set of one or more segments of the indexed store, receiving a second search query;
   in response to receiving the second search query, determining that the first search query is being evaluated against the particular segment;
   in response to determining that the first search query is being evaluated against the particular segment, commencing execution of the second search query on the particular segment such that the first and second search queries are both evaluated against the particular segment while the particular segment remains loaded;

continuing the execution of the first and second search queries by loading the second set of one or more segments and evaluating that first and second search queries against each of the one or more segments of the second set; and after the first and second search queries have been evaluated against each of the one or more segments in the second set, continuing execution of the second search query by loading and evaluating the second search query against the one or more segments in the first set.

14. The computer storage media of claim 13, wherein the method further comprises:

storing an indication that the second search query was commenced on the particular segment.

15. The computer storage media of claim 13, wherein the query processor is configured to load the segments of the indexed store in a defined order, and wherein the first set of one or more segments precede the particular segment in the defined order and the second set of one or more segments follow the particular segment in the defined order.

16. The computer storage media of claim 13, wherein the method further comprises:

receiving one or more additional search queries while the second search query is executing;

for each of the additional search queries:
determining which segment of the indexed store the second search query is being evaluated against when the additional search query is received; and
commencing execution of the additional search query on the determined segment.

17. The computer storage media of claim 16, wherein at least one of the additional search queries is received when the first search query is still executing such that the at least one additional search query is commenced on a segment against which the first and second search queries are being evaluated.

18. The computer storage media of claim 13, wherein the indexed store comprises a plurality of indexes, wherein determining that the first search query is being evaluated against the particular segment comprises determining an index that contains the particular segment, and wherein commencing execution of the second search query on the particular segment comprises reading and searching the index that contains the particular segment.

19. The computer storage media of claim 18, wherein the index that contains the particular segment does not include any other segment.

20. One or more computer storage media storing computer executable instructions which when executed on a server implement the following components:

an interface for receiving search queries; and a query processor for executing the received search queries against an indexed store that includes a plurality of segments, the query processor being configured to:

execute a first search query by loading segments of the indexed store and evaluating the first search query against the loaded segments;

while the first search query is being evaluated against a particular segment of the plurality of segments of the indexed store and after the first search query has been evaluated against a first set of one or more segments of the indexed store but before the first search query has been evaluated against a second set of one or more segments of the indexed store, receiving a second search query;

in response to receiving the second search query, determining that the first search query is being evaluated against the particular segment, in response to determining that the first search query is being evaluated against the particular segment, commencing execution of the second search query on the particular segment such that the first and second search queries are both evaluated against the particular segment while the particular segment remains loaded;

continuing the execution of the first and second search queries by loading the second set of one or more segments and evaluating that first and second search queries against each of the one or more segments of the second set; and after the first and second search queries have been evaluated against each of the one or more segments in the second set, continuing execution of the second search query by loading and evaluating the second search query against the one or more segments in the first set.

* * * * *